United States Patent
Taylor

(10) Patent No.: US 9,080,320 B1
(45) Date of Patent: Jul. 14, 2015

(54) SHOWER HEAD EXTENSION APPARATUS

(71) Applicant: Jim E. Taylor, Running Springs, CA (US)

(72) Inventor: Jim E. Taylor, Running Springs, CA (US)

(*) Notice: Subject to any disclaimer, the term of this patent is extended or adjusted under 35 U.S.C. 154(b) by 11 days.

(21) Appl. No.: 13/907,013

(22) Filed: May 31, 2013

(51) Int. Cl.
- *B05B 1/18* (2006.01)
- *B05B 15/06* (2006.01)
- *E03C 1/06* (2006.01)
- *F16L 37/48* (2006.01)
- *E03C 1/04* (2006.01)

(52) U.S. Cl.
CPC ............... *E03C 1/0408* (2013.01); *B05B 1/185* (2013.01); *F16L 37/48* (2013.01); *B05B 15/065* (2013.01); *E03C 1/06* (2013.01)

(58) Field of Classification Search
CPC ........ B05B 1/18; B05B 1/185; B05B 15/065; B05B 15/066; B05B 15/08; E03C 1/0408; E03C 1/06; E03C 1/086; F16L 33/28; F16L 33/32; F16L 37/48
USPC .............. 239/103, 266, 268, 269, 288–288.5, 239/391, 397, 499, 525, 530, 548, 587.1, 239/588, 600; 4/601, 604, 605, 615; 285/8, 285/252
See application file for complete search history.

(56) References Cited

U.S. PATENT DOCUMENTS

| | | | |
|---|---|---|---|
| 3,009,654 A * | 11/1961 | Wehrle | 239/499 |
| 4,752,975 A | 6/1988 | Yates | |
| 5,022,103 A | 6/1991 | Faist | |
| 5,028,077 A * | 7/1991 | Hurst | 285/8 |
| 6,315,220 B1 * | 11/2001 | Grubb | 239/588 |
| D545,949 S | 7/2007 | Coates | |
| 8,109,450 B2 | 2/2012 | Luettgen et al. | |
| 2006/0208111 A1 | 9/2006 | Tracy et al. | |
| 2006/0214025 A1 | 9/2006 | Kim | |
| 2006/0283336 A1 | 12/2006 | Eveleigh et al. | |
| 2007/0200013 A1 | 8/2007 | Hsiao | |
| 2010/0314468 A1 | 12/2010 | Han | |

* cited by examiner

*Primary Examiner* — Darren W Gorman

(57) ABSTRACT

An apparatus for re-directing the fluid flow emanating from an existing shower head which comprises a boot, a mechanical slide fastener, which in a preferred construction is fluid-tight, a thumb handle hose clamp, a flexible hose, and a spray nozzle. The apparatus is intended to co-operate with an existing shower head, which existing shower head has a supply line. The boot of the apparatus encompasses the shower head and is closed around the supply line thereof by the mechanical slide fastener. Once closed thereon, it is secured by the thumb handle hose clamp, which facilitates a fluid-tight seal. When fluid flows from the existing shower head, it exits the boot through the flexible hose, which transfers it to the spray nozzle, from where it is dispensed.

8 Claims, 3 Drawing Sheets

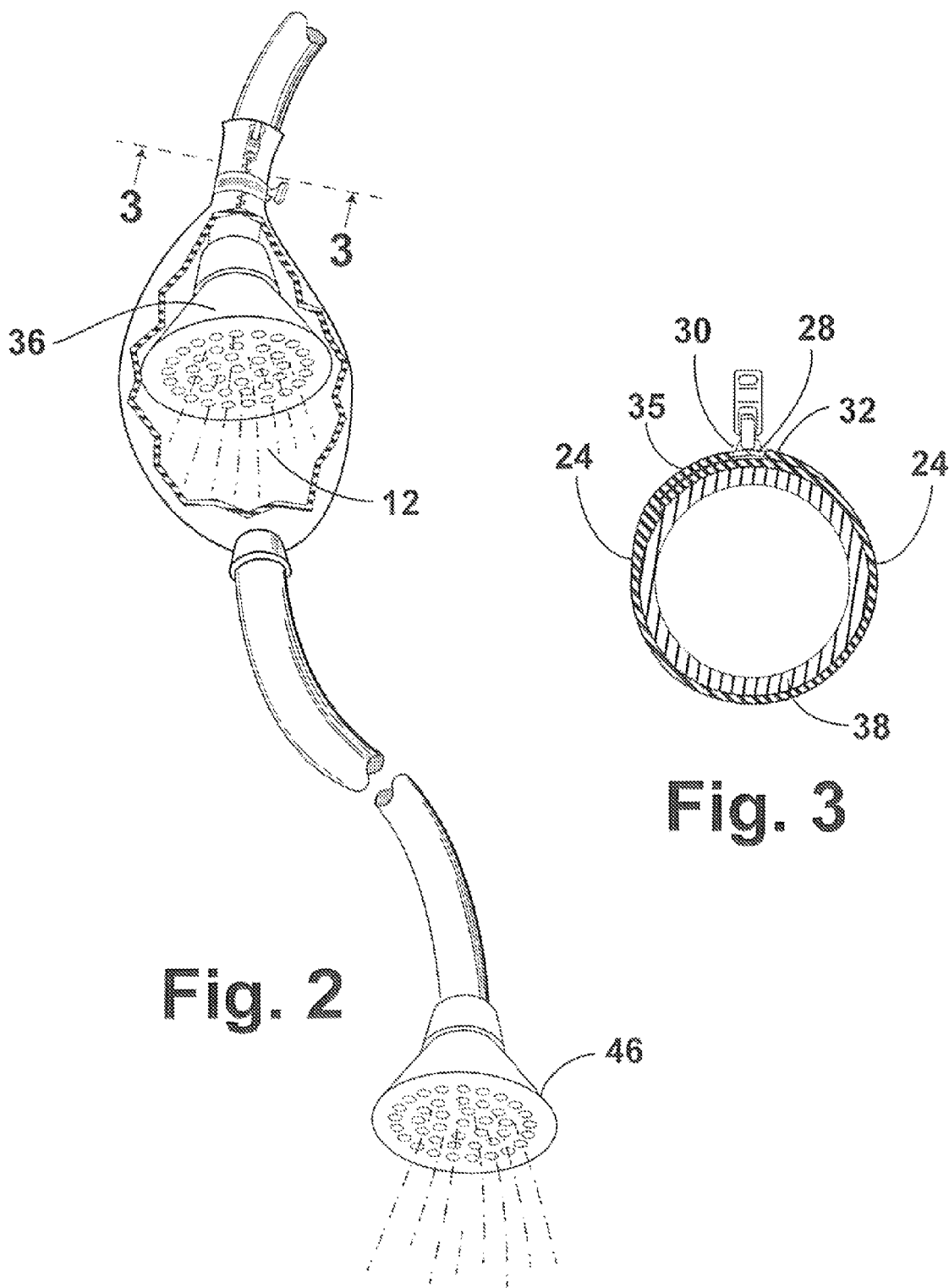

SHOWER HEAD EXTENSION APPARATUS

BACKGROUND OF THE INVENTION

1. Field of the Invention

The present invention relates to a shower accessory, and more particularly, a SHOWER HEAD EXTENSION APPARATUS.

2. Description of the Prior Art

Numerous innovations for shower accessories have been provided in the prior art that will be described. Even though these innovations may be suitable for the specific individual purposes to which they address, however, they differ from the present invention.

A FIRST EXAMPLE, U.S. Pat. No. 4,752,975, Published/Issued on Jun. 28, 1988, to Yates teaches a shower head assembly is comprised of a diverter valve for diverting the water supply to one of two shower heads. One of the shower heads is generally laterally and adjustably displaced from the other of said shower heads by means of a swivable extension arm and the entire assembly is easily installable on the existing overhead water supply line of a shower stall or bath enclosure.

A SECOND EXAMPLE, U.S. Pat. No. 5,022,103, Published/Issued on Jun. 11, 1991, to Faist teaches an extension pipe for raising the elevation of a shower head comprising an S-shaped length of pipe having external threads on each end thereof, the lower end being a straight horizontal section of pipe and the upper end being directed downwardly from about 15.degree. to about 45.degree. below horizontal.

A THIRD EXAMPLE, U.S. Pat. No. 8,109,450, Published/Issued on Feb. 7, 2012, to Luettgen, et al. teaches A handheld showerhead has a showerhead portion and a handle portion. The showerhead portion may include at least two fluid channels. The handle portion may be operatively associated with the shower portion. The handle portion may include at least one fluid inlet or fluid passage. A rigid internal shaft is used to reinforce the connection between a fluid conveyance structure in the showerhead portion, the handle portion, or both, and a water supply connector at least partially in the handle portion The handle portion may further include a movable mode selector. Movement of the mode selector may selectively place the fluid inlet or fluid passage in fluid communication with at least one of the two fluid channels in the showerhead portion.

A FOURTH EXAMPLE, U.S. Pat. No. D545,949, Published/Issued on Jul. 3, 2007, to Coates teaches a detachable attachment for shower head A FIFTH EXAMPLE, U.S. Patent Office Document No. 20060208111, Published/issued on Sep. 21, 2006, to Tracy, et al. teaches a showerhead extension arm comprising a generally tubular body portion, first and second hub members, a showerhead engaging portion, and a shower arm coupling. The first hub member is rotationally secured to a first end of the tubular body portion and the second hub member is rotationally secured to a second end of the tubular body portion. Each of the hub members permit the flow of fluid therethrough. The showerhead engaging portion permits the showerhead extension arm to be secured to a showerhead such that the showerhead is permitted to rotate relative to an axis generally perpendicular to the tubular body portion and to simultaneously rotate relative to an axis generally parallel to the tubular body portion.

A SIXTH EXAMPLE, U.S. Patent Office Document No. 20060214025, Published/Issued on Sep. 28, 2006, to Kim teaches a showerhead extension arm comprising a generally tubular body portion, first and second hub members, a showerhead engaging portion, and a shower arm coupling. The first hub member is rotationally secured to a first end of the tubular body portion and the second hub member is rotationally secured to a second end of the tubular body portion. Each of the hub members permit the flow of fluid therethrough. The showerhead engaging portion permits the showerhead extension arm to be secured to a showerhead such that the showerhead is permitted to rotate relative to an axis generally perpendicular to the tubular body portion and to simultaneously rotate relative to an axis generally parallel to the tubular body portion.

A SEVENTH EXAMPLE, U.S. Patent Office Document No. 20060283336, Published/Issued on Dec. 21, 2006, to Eveleigh, et al. teaches a quick disconnect shower head having a shower head housing operable to receive a quick disconnect fitting connected to a hose or other apparatus such that the apparatus is readily connected or disconnected to the shower head housing.

AN EIGHTH EXAMPLE, U.S. Patent Office Document No. 20070200013, Published/Issued on Aug. 30, 2007, to Hsiao teaches a shower head includes a housing having a first side formed with a plurality of water outlet holes, a plurality of nozzles each detachably mounted in the respective water outlet hole, a top cover detachably mounted on an open second side of the housing, and a water dividing member detachably mounted on the top cover and connected to the inside of the housing. Thus, the top cover can be detached from the housing to facilitate a user washing the inside of the housing. In addition, each of the nozzles is made of a flexible material, so that each of the nozzles can be deformed to detach from the respective water outlet hole easily and quickly, thereby facilitating the user replacing the nozzles.

A NINTH EXAMPLE, U.S. Patent Office Document No. 20100314468, Published/Issued on Dec. 16, 2010, to Han teaches a new air-pressure utilizing water-saving shower head which takes in external air to increase the spray pressure is introduced. According to the present invention, this water-saving shower head comprises, a holding space for water inside, a body that contains an air hole at the bottom to take in the external air, the internal cross-sectional areas decreasing and then increasing, an air intake hole connecting into the air hole of the upper body, a pressure applying unit which mixes the external air coming through the air hole with the novelty of the pressure of the water flow movement, positioned at the front side of upper body and consists of an extended spray tube with multiple spray boards protruding outward.

It is apparent now that numerous innovations for shower accessories have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a SHOWER HEAD EXTENSION APPARATUS that avoids the disadvantages of the prior art.

ANOTHER OBJECT of the present invention is to provide a SHOWER HEAD EXTENSION APPARATUS that is simple and inexpensive to manufacture.

STILL ANOTHER OBJECT of the present invention is to provide a SHOWER HEAD EXTENSION APPARATUS that is simple to use.

BRIEFLY STATED, STILL YET ANOTHER OBJECT of the present invention is to provide a SHOWER HEAD EXTENSION APPARATUS that permits a user to re-direct the flow of an existing shower head to a different spray nozzle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 2 is a view thereof with parts broken away illustrating a conventional shower head installed in a separable pouch of the invention;

FIG. 3 is an enlarged diagrammatic cross sectional view taken along line 3-3 in FIG. 2.

Figure 1:
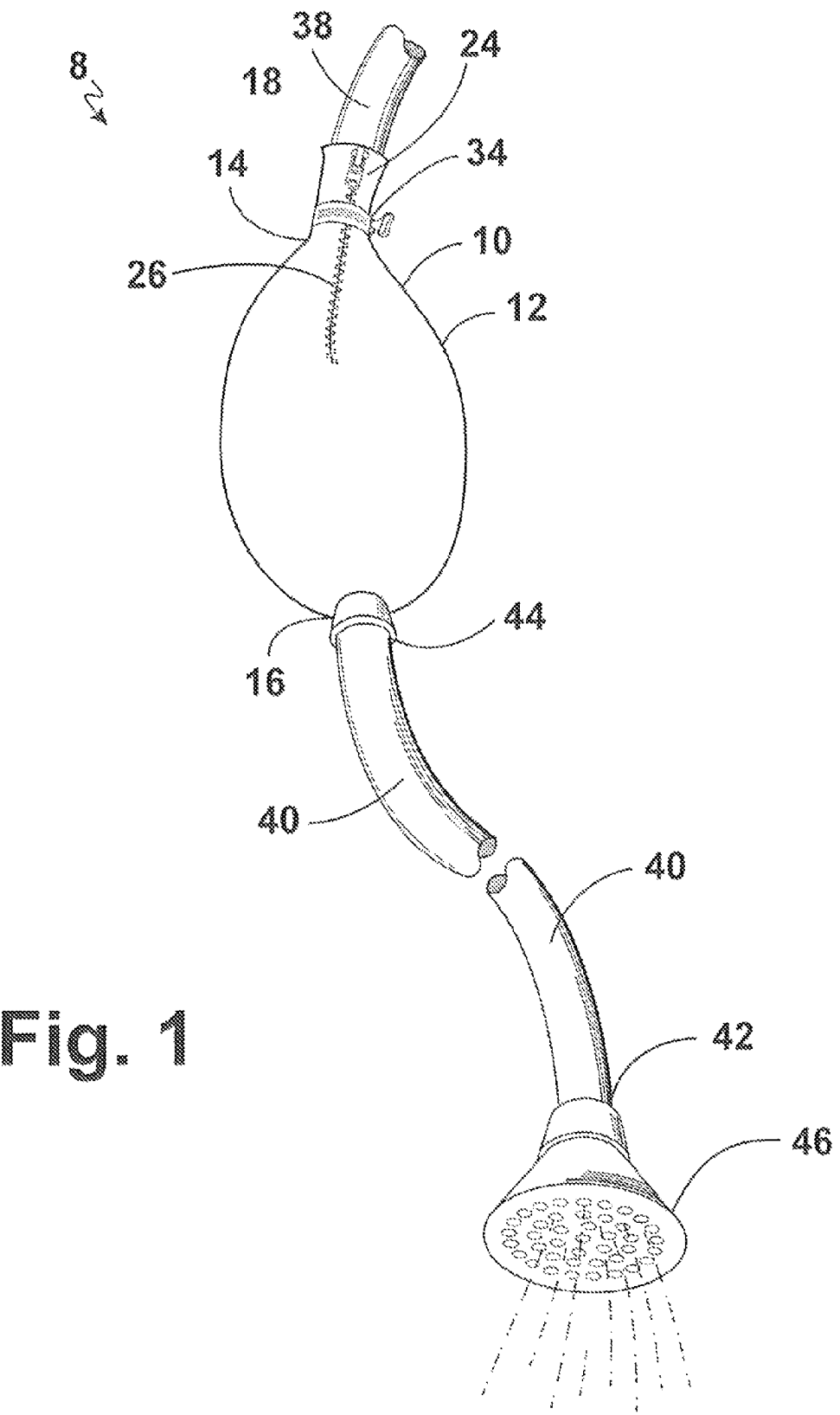
FIG. 1 is a diagrammatic perspective view illustrating the present invention installed on a shower head an in use.

A MARSHALING OF REFERENCE NUMERALS UTILIZED IN THE DRAWINGS 8 apparatus for re-directing the fluid flow from an existing shower head 36;
10 boot;
12 body of the boot 10;
14 proximal end of the body 12 of the boot 10;
16 distal end of the body 12 of the boot 10;
18 collar of the boot 10;
20 first end of the collar 18 of the boot 10;
22 second end of the collar 18 of the boot 10;
24 outer surface of the collar 18 of the boot 10;
26 mechanical slide fastener;
28 first track of the mechanical slide fastener 26;
30 second track of the mechanical slide fastener 26;
32 path along which the first track 28 of the mechanical slide fastener 26 is secured to the outer surface 24 of the collar 18 of the boot 10;
34 thumb handle hose clamp;
35 portion of the collar between the path 32 along which the first track 28 of the mechanical slide fastener 26 is secured to the outer surface 24 of the collar 18 of the boot 10; and the second end 22 of the collar 18 of the boot 10;
36 existing shower head;
38 supply line of the existing shower head 36;
40 flexible hose;
42 proximal end of the flexible hose 40;
44 distal end of the flexible hose 40; and
46 spray nozzle.

DETAILED DESCRIPTION OF THE PREFERRED EMBODIMENT

Referring now to the figures, in which like numerals indicate like parts, and particularly to FIG. 1, which is a perspective view showing an apparatus 10 for re-directing the fluid flow emanating from an existing shower head 36 which comprises a boot 10, a mechanical slide fastener 26, which in a preferred construction is fluid-tight, a thumb handle hose clamp 34, a flexible hose 40, and a spray nozzle 46. The apparatus 48 is intended to co-operate with an existing shower head 36, which existing shower head 36 has a supply line 38. The configuration of the flexible hose 40 is to have its proximal end 42 attached to the spray nozzle 46, and its distal end 44 attached to the proximal end 14 of the body 12 of the boot 10. This thereby permits it to transfer fluid from the boot 10 to the spray nozzle 46.

The configuration of the apparatus 48 with respect to the existing shower head 36 and supply line 38 thereof is most clearly illustrated in FIG. 2, which shows that the body 12 of the boot 10 encompasses the existing shower head 36, and is secured to the supply line 38 by a thumb handle hose clamp 34, which thumb handle hose clamp encircles the neck 18 of the boot. The collar 18 of the boot 10 is attached at the distal end 16 of the body 12 of the boot 10 and is closed around the supply line 38 of the shower head 36 by the mechanical slide fastener 26. Once closed thereon, it is secured thereon by the thumb handle hose clamp 34, which facilitates a strong and fluid-tight seal.

Figure 4:
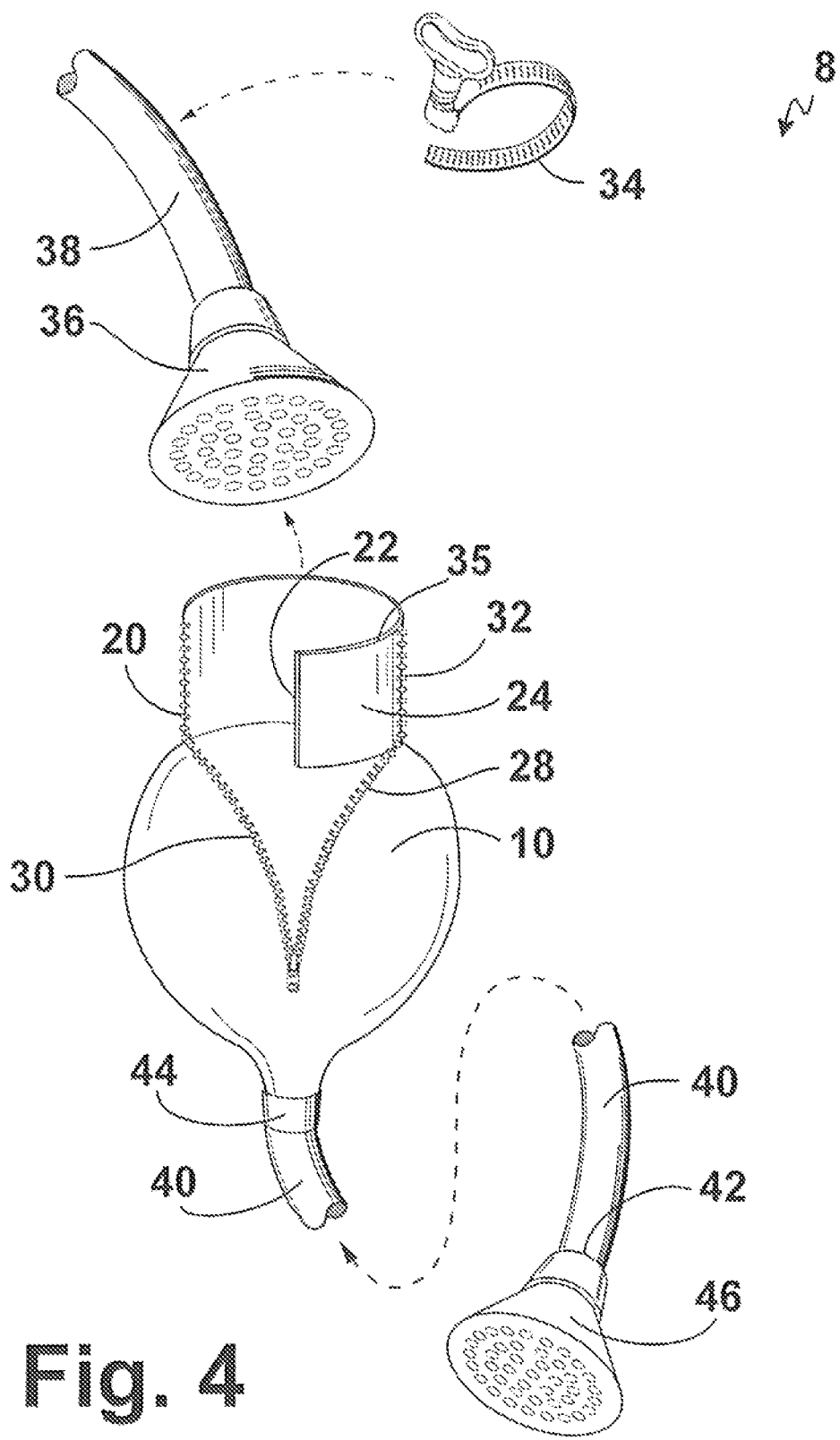
FIG. 4 is an exploded diagrammatic assembly view showing how the components are installed together with each other.

The configuration of the mechanical slide fastener 26 can most clearly be seen in FIGS. 3-4. The mechanical slide fastener 26 has a first track 28 and a second track 30. The tracks are attached to the collar 18 of the boot 10. Specifically, the collar 18 of the boot 10 has a first end 20 and a second end 22. The first track 28 of the mechanical slide fastener 26 is attached to the outer surface 24 of the collar 18 of the boot 10 along a path 32. This attachment creates a portion 35 of the collar 18 between the path along which the first track 28 of the mechanical slide fastener 26 is secured to the outer surface 24 of the collar 18 of the boot 10; and the second end 22 of the collar 18 of the boot 10. The second track 30 of the mechanical slide fastener 26 runs along the first end of the collar 18 of the boot 10.

When the two tracks of the mechanical slide fastener 26 are joined together, the resultant closure thereby rests on top of the portion 35 of the collar between the path 32 along which the first track 28 of the mechanical slide fastener 26 is secured to the outer surface 24 of the collar 18 of the boot 10 and the second end 22 of the collar 18 of the boot 10. This configuration provides an advantageous feature of the mechanical slide fastener being insulated from direct contact with the supply line 38 of the existing shower head 36. This is advantageous because even with a fluid-tight mechanical slide fastener 26, the material of the collar 18 of the boot 10 will likely prove more secure against fluids than the mechanical slide fastener 26. Furthermore, the material of the collar 18 would likely prove less abrasive to the supply line 38 than a mechanical slide fastener 26 alone, particularly when compressed thereon by a thumb handle hose clamp 34.

It will be understood that each of the elements described above, or two or more together, may also find a useful application in other types of constructions differing from the types described above.

While the invention has been illustrated and described as embodiments of a SHOWER HEAD EXTENSION APPARATUS, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An apparatus for re-directing the fluid flow emanating from an existing shower head, which comprises:
   a) a boot;
   b) a fluid-tight mechanical slide fastener;
   c) a thumb handle hose clamp;
   d) a fluid transfer mean; and
   e) a spray nozzle;
   wherein said boot comprises a body and a collar,
   wherein said body of said boot has a proximal end and a distal end:
   wherein said collar of said boot is integrally attached to said proximal end of said body, and said fluid transfer mean is attached to said distal end of said body;
   wherein said boot is for encompassing the existing shower head, to existing shower head being attached to a fluid supply line;
   wherein said collar of said boot more than fully circumscribes the fluid supply line and wraps around itself is so doing;
   wherein said fluid-tight mechanical slide fastener is for closing said boot around the existing shower head;
   wherein said thumb handle hose clamp is for securing said boot to the existing shower head and to the fluid supply line of the existing shower head, whereby said thumb handle hose clamp facilitates maintaining a fluid-tight seal between the collar of the boot and the fluid supply line of the existing shower head;
   wherein said boot encapsulates the existing shower in a substantially fluid-tight enclosure when closed by said fluid-tight mechanical slide fastener and secured by said thumb handle hose clamp, with fluid being substantially forced to escape by said fluid transfer means; and
   wherein said fluid transfer means is for transferring fluid from said boot to said spray nozzle.

2. The apparatus of claim 1, wherein said thumb handle hose clamp secures said boot to the fluid supply line via encircling said collar of said boot when said collar more than fully circumscribes the fluid supply line.

3. The apparatus of claim 2, wherein said collar has:
   a) a first end; and
   b) a second end.

4. The apparatus of claim 3, wherein said collar has an outer surface;
   wherein said mechanical slide fastener has:
   a) a first track; and
   b) a second track;
   wherein said first track of said mechanical slide fastener is secured to said outer surface of said collar along a path; and
   wherein said second track of said mechanical slide fastener is secured to said first end of said collar.

5. The apparatus of claim 4, wherein said collar has a portion between said path of said
   first track of said mechanical slide fastener and said second end of said collar; and
     wherein said mechanical slide fastener, when closed, rests on top of said portion
   between said path of said first track of said mechanical slide fastener and said second and of said collar.

6. The apparatus of claim 5, wherein said fluid transfer means has:
   a) a proximal end; and
   b) a distal end;
   wherein said spray nozzle is fixedly attached to said proximal end of said fluid transfer mean.

7. The apparatus of claim 6, wherein said boot is fixedly attached to said distal end of said fluid transfer means.

8. The apparatus of claim 7, wherein said fluid transfer means comprises a flexible hose.

* * * * *